United States Patent
Lu

(10) Patent No.: US 10,543,927 B2
(45) Date of Patent: Jan. 28, 2020

(54) LOCKABLE TRACK SYSTEM FOR A TRANSLATING NACELLE STRUCTURE

(71) Applicant: Rohr, Inc., Chula Vista, CA (US)

(72) Inventor: Jinqiu Lu, Murrieta, CA (US)

(73) Assignee: Rohr, Inc., Chula Vista, CA (US)

( * ) Notice: Subject to any disclaimer, the term of this patent is extended or adjusted under 35 U.S.C. 154(b) by 475 days.

(21) Appl. No.: 15/355,761

(22) Filed: Nov. 18, 2016

(65) Prior Publication Data

US 2018/0141673 A1    May 24, 2018

(51) Int. Cl.
*B64D 29/06* (2006.01)
*F02K 1/72* (2006.01)

(52) U.S. Cl.
CPC .............. *B64D 29/06* (2013.01); *F02K 1/72* (2013.01); *F05D 2220/323* (2013.01); *F05D 2260/52* (2013.01)

(58) Field of Classification Search
CPC ......... B64D 29/06; B64D 29/08; F02K 1/766; F02K 1/72
USPC ................................ 60/226.2; 244/110 B, 54
See application file for complete search history.

(56) References Cited

U.S. PATENT DOCUMENTS

| | | | |
|---|---|---|---|
| 3,638,983 A * | 2/1972 | Flournoy | B64C 1/1415 292/302 |
| 4,037,809 A | 7/1977 | Legrand | |
| 5,136,839 A | 8/1992 | Armstrong | |
| 5,448,884 A * | 9/1995 | Repp | F02K 1/76 239/265.31 |
| 6,340,135 B1 | 1/2002 | Barton | |
| 6,584,763 B2 * | 7/2003 | Lymons | F02K 1/72 239/265.19 |
| 6,625,972 B1 * | 9/2003 | Sternberger | F02K 1/76 239/265.29 |
| 8,070,101 B2 * | 12/2011 | Vauchel | B64D 29/06 244/110 B |
| 8,181,905 B2 | 5/2012 | McDonough et al. | |
| 8,875,486 B2 * | 11/2014 | Roberts | B64D 29/06 239/265.11 |
| 8,919,693 B2 | 12/2014 | Vauchel | |
| 9,188,026 B2 | 11/2015 | Calder et al. | |
| 9,249,756 B2 | 2/2016 | Caruel et al. | |
| 9,567,943 B2 * | 2/2017 | Roberts | F02K 1/766 |
| 9,783,315 B2 * | 10/2017 | James | B64D 29/08 |

(Continued)

OTHER PUBLICATIONS

EP search report for EP17202441.6 dated Jan. 16, 2018.

*Primary Examiner* — Jason D Shanske
*Assistant Examiner* — Hakeem M Abdellaoui
(74) *Attorney, Agent, or Firm* — O'Shea Getz P.C.

(57) ABSTRACT

An assembly is provided for an aircraft propulsion system. This assembly includes a fanlet and a track system configured to enable axial translation of the fanlet along a centerline between an open position and a closed position. The track system includes a first component, a second component and a lock. One of the first and the second components is configured as or otherwise includes a slider. The other one of the first and the second components is configured as or otherwise includes a track. The slider is mated with and configured to slide axially along the track. The lock is configured as or otherwise includes a bolt mounted with the first component. The lock is configured to move the bolt laterally into an aperture in the second component to prevent axial translation of the fanlet.

19 Claims, 8 Drawing Sheets

(56) References Cited

U.S. PATENT DOCUMENTS

| | | | |
|---|---|---|---|
| 2002/0125370 A1* | 9/2002 | Dehu | F02K 1/72 244/110 B |
| 2002/0195827 A1 | 12/2002 | Jackson et al. | |
| 2003/0024236 A1* | 2/2003 | Lymons | F02K 1/72 60/226.2 |
| 2010/0059634 A1* | 3/2010 | Vauchel | B64D 29/06 244/53 B |
| 2010/0064660 A1* | 3/2010 | Vauchel | B64D 15/12 60/226.2 |
| 2010/0084507 A1* | 4/2010 | Vauchel | B64D 29/08 244/1 N |
| 2010/0264676 A1* | 10/2010 | Sternberger | B64C 13/00 292/302 |
| 2010/0314501 A1 | 12/2010 | Vauchel et al. | |
| 2011/0014044 A1* | 1/2011 | Vauchel | B64D 29/06 415/214.1 |
| 2011/0120078 A1* | 5/2011 | Schwark, Jr. | F02K 1/72 60/226.2 |
| 2011/0277448 A1* | 11/2011 | Roberts | B64D 29/06 60/226.2 |
| 2012/0137654 A1* | 6/2012 | Burgess | F02K 1/06 60/204 |
| 2013/0062433 A1* | 3/2013 | Vauchel | B64D 29/06 239/265.19 |
| 2013/0312387 A1* | 11/2013 | West | F02K 1/09 60/226.2 |
| 2014/0116024 A1* | 5/2014 | Channel | F02K 1/72 60/226.2 |
| 2015/0292436 A1 | 10/2015 | Conet et al. | |
| 2015/0308379 A1* | 10/2015 | James | F02K 1/72 60/226.2 |
| 2016/0084360 A1* | 3/2016 | Foucaut | F16H 25/20 74/89.23 |
| 2016/0222917 A1* | 8/2016 | Segat | B64D 33/04 |
| 2016/0280383 A1* | 9/2016 | Lee | B64D 29/08 |
| 2016/0281640 A1 | 9/2016 | Loncle | |
| 2017/0226962 A1* | 8/2017 | Crawford | F01D 25/24 |
| 2017/0284337 A1* | 10/2017 | Schrell | F02K 1/605 |

* cited by examiner

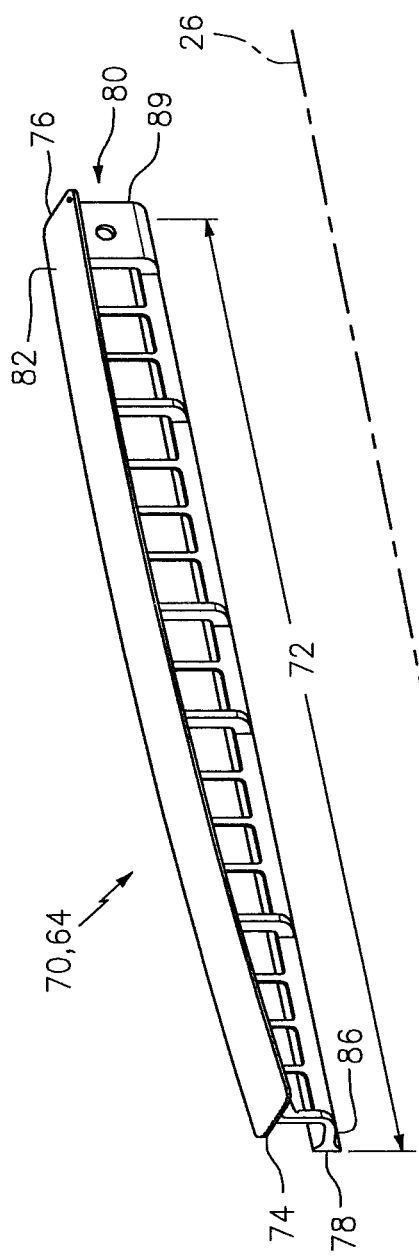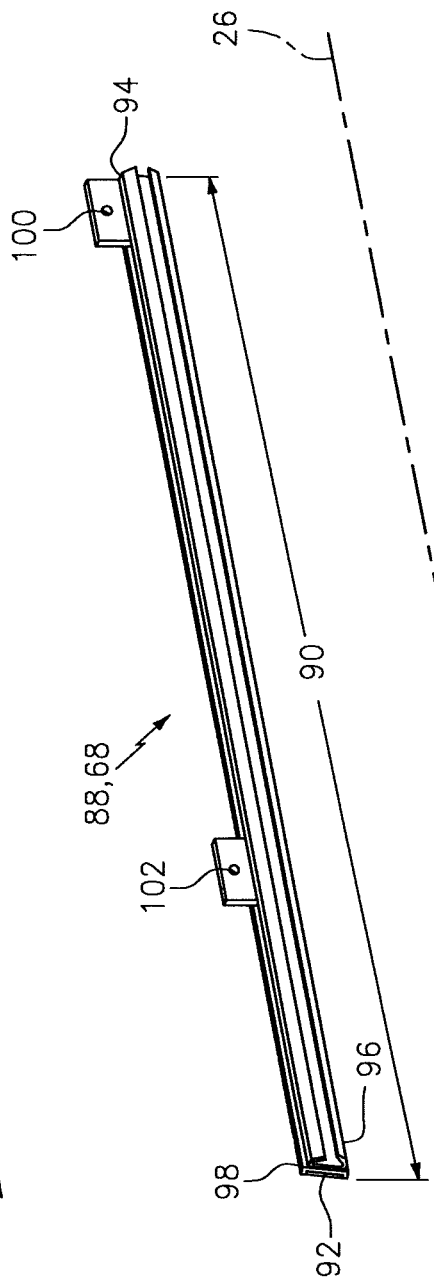

LOCKABLE TRACK SYSTEM FOR A TRANSLATING NACELLE STRUCTURE

BACKGROUND OF THE INVENTION

1. Technical Field

This disclosure relates generally to an aircraft propulsion system and, more particularly, to a nacelle with at least one translatable structure such as, for example, a translating fanlet.

2. Background Information

Some modern nacelle designs include a translatable structure such as a fanlet that axially translates between an open position and a closed position. A typical lock for such a translatable structure is only operable to secure that translatable structure in the closed position. However, inadvertent/accidental movement of the translatable structure when open may cause injury to maintenance personnel. Therefore, there is a need in the art for a system capable of securing the translatable structure in a closed position as well as an open position.

SUMMARY OF THE DISCLOSURE

According to an aspect of the present disclosure, an assembly is provided for an aircraft propulsion system. This assembly includes a fanlet and a track system configured to enable axial translation of the fanlet along a centerline between an open position and a closed position. The track system includes a first component, a second component and a lock. One of the first and the second components is configured as or otherwise includes a slider. The other one of the first and the second components includes or otherwise includes a track. The slider is mated with and configured to slide axially along the track. The lock includes or otherwise includes a bolt mounted with the first component. The lock is configured to move the bolt laterally into an aperture in the second component to prevent axial translation of the fanlet.

According to another aspect of the present disclosure, an assembly is provided for an aircraft propulsion system. This assembly includes a nacelle structure which is configured as or otherwise includes a cowl. The assembly also includes a track system configured to enable axial translation of the nacelle structure along a centerline between an open position and a closed position. The track system includes a first component, a second component and a lock. The first component is configured as or otherwise includes an axially extending slider. The second component is configured as or otherwise includes an axially extending track. The first component is fixedly mounted with the cowl. The slider is mated with and configured to slide axially along the track. The lock is configured as or otherwise includes a bolt mounted with the first component. The lock is configured to move the bolt laterally into an aperture in the second component to prevent axial translation of the fanlet.

According to another aspect of the present disclosure, an assembly is provided for an aircraft propulsion system. This assembly includes a nacelle structure which is configured as or otherwise includes a cowl. The assembly also includes a track system configured to enable axial translation of the fanlet along a centerline between an open position and a closed position. The track system includes a first component, a second component and a lock. The first component is configured as or otherwise includes an axially extending slider. The second component is configured as or otherwise includes an axially extending track. The slider is mated with and configured to slide axially along the track. The lock is configured to engage a first aperture in the second component to prevent axial translation of the nacelle structure at the closed position. The lock is further configured to engage a second aperture in the second component to prevent axial translation of the nacelle structure at the open position.

The lock may be configured as or otherwise include a bolt mounted with the first component. The lock may be configured to move the bolt laterally into the first aperture at the closed position and laterally into the second aperture at the open position.

The lock may be spring loaded.

The track system may further include a third component, a fourth component and a second lock. The third component may be configured as or otherwise include an axially extending second slider. The fourth component may be configured as or otherwise include an axially extending second track. The second slider may be mated with and configured to slide axially along the second track. The second lock may be configured to engage a third aperture in the second component to prevent axial translation of the nacelle structure at the closed position. The second lock may be further configured to engage a fourth aperture in the second component to prevent axial translation of the nacelle structure at the open position.

The lock may be configured to move the bolt laterally into the aperture in the second component when the fanlet is in the closed position.

The lock may be configured to move the bolt laterally into a second aperture in the second component to prevent axial translation of the fanlet when the fanlet is in the open position.

The lock may be configured to move the bolt laterally into the aperture in the second component when the fanlet is in the open position.

The slider may be mounted to the fanlet.

The track may be mounted to a fan case. The track may also or alternatively be mounted to another static structure.

The first component is mounted with the fanlet and the second component is mounted with a static structure. This static structure may be a fan case.

The bolt may be spring loaded.

The lock may further include a fixed base. A threaded portion of the bolt may be mated with a threaded aperture in the fixed base.

The lock may be operable to be actuated by a driver tool.

A spring loaded access door may be included and configured to close an access port in the fanlet. The lock may be accessible from an exterior of the fanlet through the access port. For example, the lock may be accessible by pushing the access door inward from the exterior of the fanlet.

The track system may further include a third component, a fourth component and a second lock. One of the third and the fourth components may be configured as or otherwise include a second slider. The other one of the third and the fourth components may be configured as or otherwise include a second track. The second slider may be mated with and configured to slide axially along the second track. The second lock may be configured as or otherwise include a second bolt mounted with the third component. The second lock may be configured to move the second bolt laterally into a second aperture in the fourth component to prevent axial translation of the fanlet.

The fanlet may be configured as or otherwise include an inlet structure and a fan cowl.

The foregoing features and the operation of the invention will become more apparent in light of the following description and the accompanying drawings.

BRIEF DESCRIPTION OF THE DRAWINGS

FIG. 7 is a perspective diagrammatic illustration of a slider rail.

FIG. 8 is a perspective diagrammatic illustration of a track rail with lock apertures for opened and closed position.

DETAILED DESCRIPTION OF THE INVENTION

Figure 1:
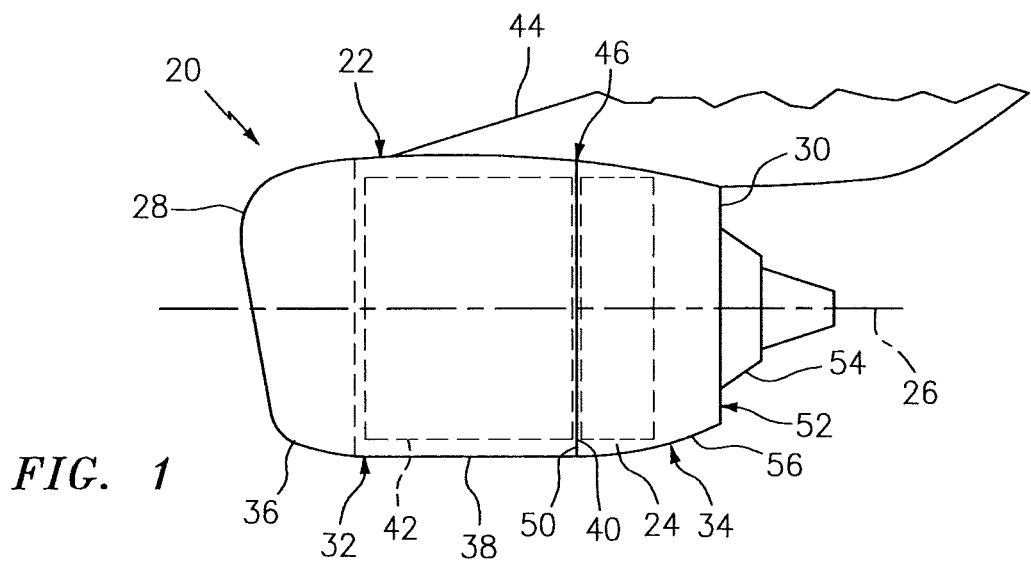
FIG. 1 is a side illustration of an aircraft propulsion system with a translatable fanlet and a translatable thrust reverser sleeve in stowed positions.
Figure 3:
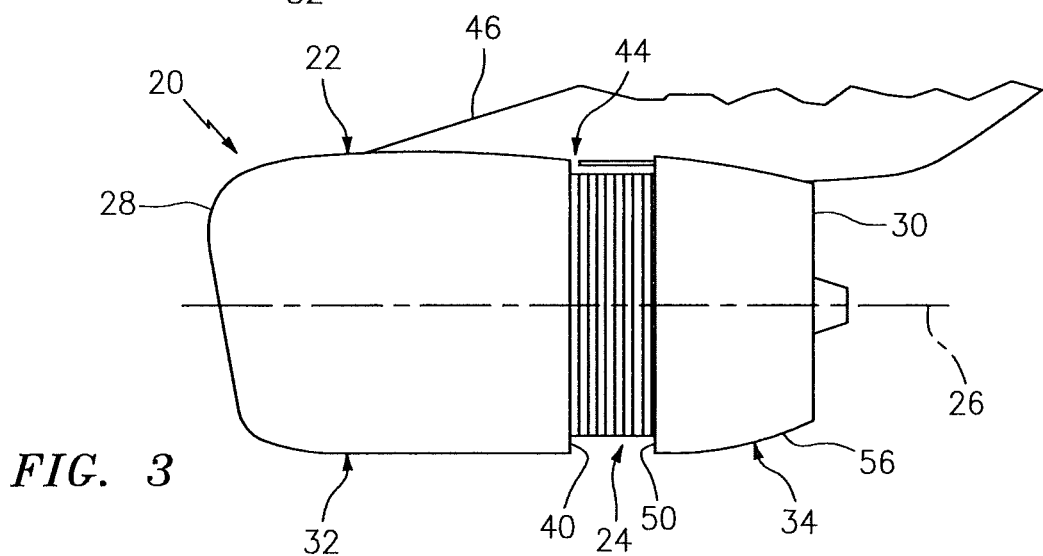
FIG. 3 is a side illustration of the aircraft propulsion system with the fanlet in the stowed position and the thrust reverser sleeve in a fully deployed position.

FIG. 1 illustrates an aircraft propulsion system 20 for an aircraft such as a commercial airliner. The propulsion system 20 includes a nacelle 22 and a gas turbine engine. This gas turbine engine may be configured as a turbofan engine. Alternatively, the gas turbine engine may be configured as a turbojet engine or any other type of gas turbine engine capable of propelling the aircraft. The propulsion system 20 may also include a thrust reverser system 24 configured with the nacelle 22; see also FIG. 3. However, in alternative embodiments, the nacelle 22 may be configured without the thrust reverser system 24.

The nacelle 22 of FIG. 1 circumscribes the gas turbine engine to provide an aerodynamic covering for the gas turbine engine. The nacelle 22 also forms a bypass gas path with the gas turbine engine, whereby air from the engine's turbofan is routed through the bypass gas path and around a core of the gas turbine engine and generates a majority (e.g., more than 75%) of engine thrust out of the aircraft propulsion system 20 in the case of a turbofan engine configuration.

The nacelle 22 extends along an axial centerline 26 between a forward nacelle end 28 and an aft nacelle end 30. The nacelle 22 includes a forward nacelle structure 32 and an aft nacelle structure 34.

The forward nacelle structure 32 may be configured as a fanlet, and is referred to below as fanlet 32 for ease of description. This fanlet 32 includes an inlet structure 36 (e.g., cowl or module) and a fan cowl 38. Of course, in other embodiments, the fanlet 32 may also include one or more additional structures/components such as an acoustic inner barrel, etc.

The inlet structure 36 is disposed at the forward nacelle end 28. The inlet structure 36 is configured to direct a stream of air through an inlet orifice at the forward nacelle end 28 and into the propulsion system 20 towards the gas turbine engine. The fan cowl 38 is disposed at an aft end 40 of the fanlet 32 and extends axially between the inlet structure 36 and the aft nacelle structure 34. The fan cowl 38 may be generally axially aligned with a fan section of the gas turbine engine. The fan cowl 38 is configured to provide an aerodynamic covering for a fan case 42 (see also FIG. 2) which circumscribes the fan section.

Figure 2:
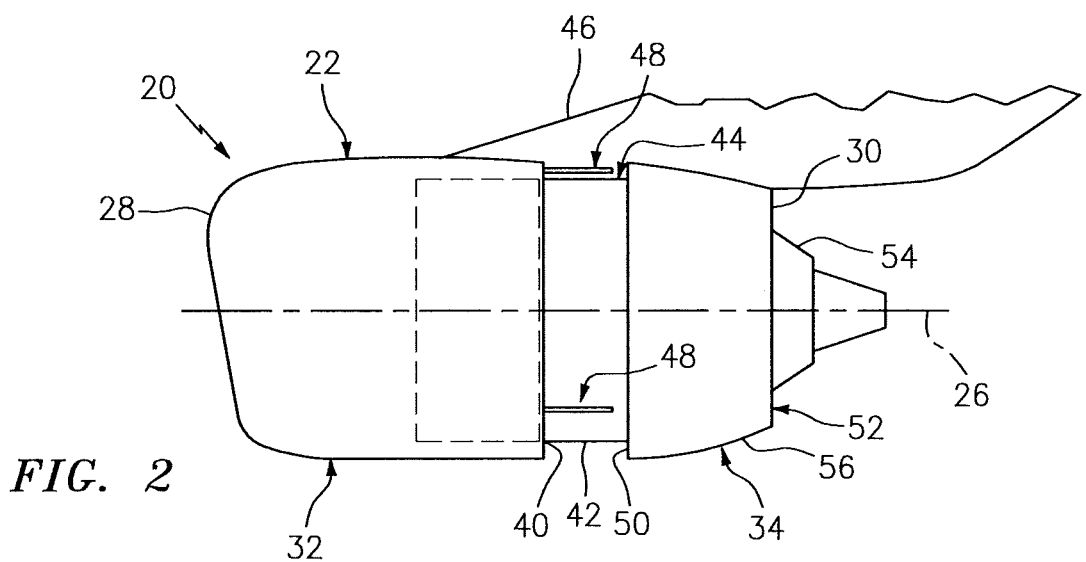
FIG. 2 is a side illustration of the aircraft propulsion system with the fanlet in a partially deployed position and the thrust reverser sleeve in the stowed position.

Referring to FIGS. 1 and 2, the fanlet 32 is configured as a cohesive, translatable structure. In particular, the inlet structure 36 forms a forward portion of the fanlet 32 and the fan cowl 38 forms an aft portion of the fanlet 32. The fanlet 32 is slidably connected to a static structure 44, for example the fan case 42 and/or a pylon structure 46 and/or another static engine structure, through a track system 48, where the track system 48 provides a translatable joint between the fanlet 32 and the static structure 44 as described below in further detail. In this manner, the entire fanlet 32 including the inlet structure 36 and the fan cowl 38 may translate axially along the centerline 26 as shown in FIGS. 1 and 2. The fanlet 32 may thereby move axially between a closed/stowed position (see FIG. 1) and a fully open/deployed position, where FIG. 2 illustrates the fanlet 32 in a partially-open/deployed position. In the closed position, the inlet structure 36 and the fan cowl 38 provide the functionality described above. In the partially-open position and the fully open position, the fanlet 32 at least partially (or substantially completely) uncovers at least the fan case 42 and devices and systems mounted thereto (not shown for ease of illustration). This may facilitate propulsion system 20 assembly and maintenance.

Referring to FIG. 1, the aft nacelle structure 34 is disposed at the aft nacelle end 30 and extends axially between a forward end 50 thereof and the aft nacelle end 30. The aft nacelle structure 34 is configured to provide an outer boundary for an axial portion of the bypass gas path, which extends through the propulsion system 20 to a bypass gas path exhaust nozzle 52. The aft nacelle structure 34 may also form the exhaust nozzle 52 in conjunction with an inner fairing assembly 54 (e.g., an inner fixed structure), which houses the core of the gas turbine engine. The aft nacelle structure 34 may be configured as or otherwise include a thrust reverser sleeve 56 for the thrust reverser system 24, which may also be referred to as a translating sleeve. The aft nacelle structure 34 may also include other components such as, but not limited to, blocker doors, etc.

The thrust reverser sleeve 56 may have a substantially tubular unitary sleeve body; e.g., may extend more than three-hundred and thirty degrees (330°) around the centerline 26. Alternatively, the thrust reverser sleeve 56 may include a pair of sleeve segments (e.g., halves) arranged on opposing sides of the propulsion system 20. The present disclosure, however, is not limited to the foregoing exemplary sleeve configurations.

Figure 4:
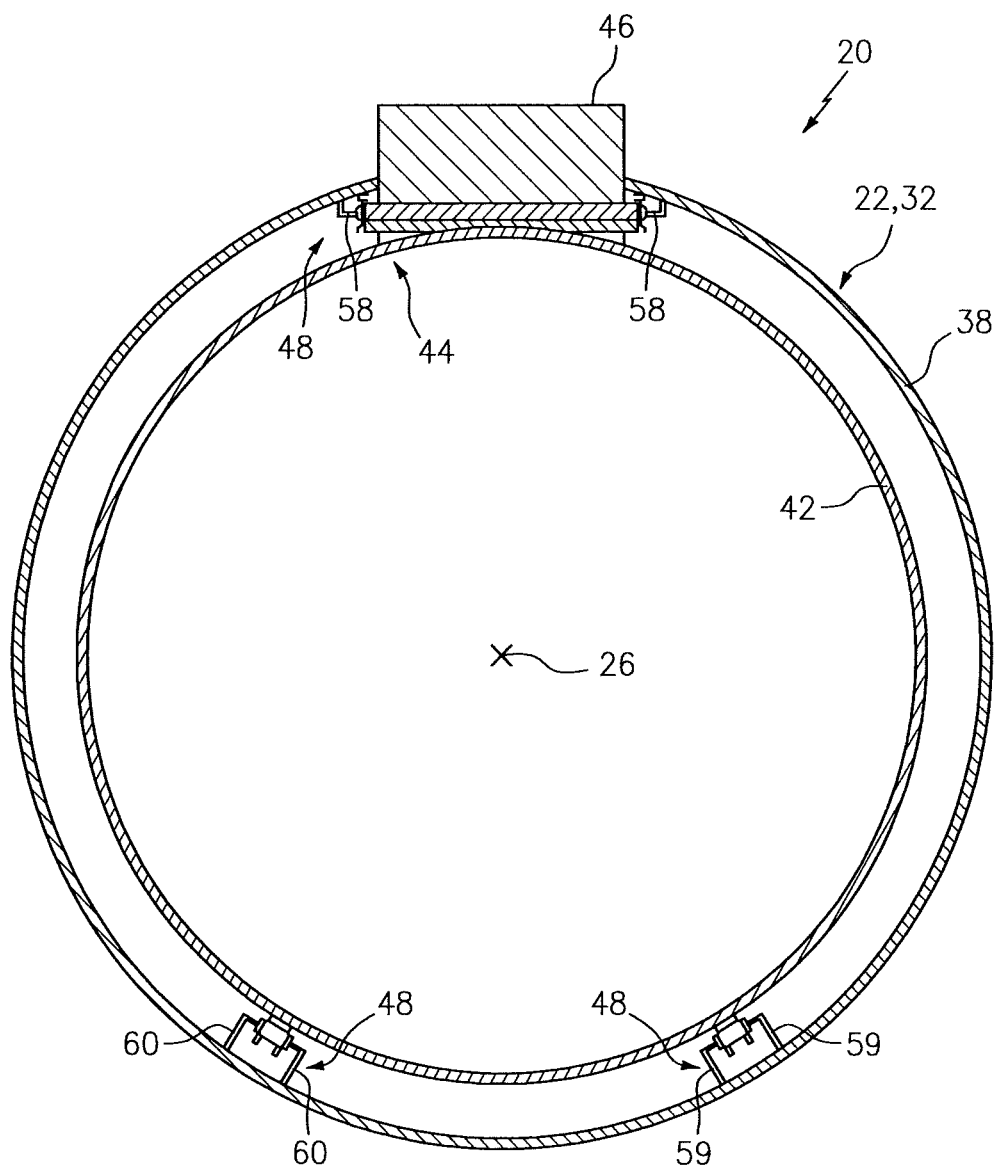
FIG. 4 is a cross-sectional illustration of a portion of the aircraft propulsion system.

FIG. 4 schematically illustrates an embodiment of the track system 48. This track system 48 is configured to enable axial translation of the fanlet 32 along the centerline 26 between an open position and a closed position. The track system 48 thereby provides a translatable joint between the fanlet 32 and the static structure 44 as set forth above. The track system 48 may include one or more translatable joint assemblies. The track system 48 of FIG. 4, for example, includes a pair of upper joint assemblies 58, a first pair of lower joint assemblies 59 and a second pair of lower joint assemblies 60.

The upper joint assemblies 58 are arranged on opposing sides of the pylon structure 46. The upper joint assemblies 58 are also arranged adjacent to the sides of the pylon structure 46. The first pair of lower joint assemblies 59 are arranged approximately at a five-o'clock position. The second pair of lower joint assemblies 60 are arranged approximately at a seven-o'clock position. The present disclosure, however, is not limited to the foregoing exemplary number and placement of the translatable joint assemblies. For example, one of the joint assemblies 59, 60 in each of the lower pairs may be omitted. In another example, the lower pairs of joint assemblies 59 and 60 may be replaced by a single translatable joint assembly or a pair of translatable joint assemblies at the six-o'clock position.

Figure 5:
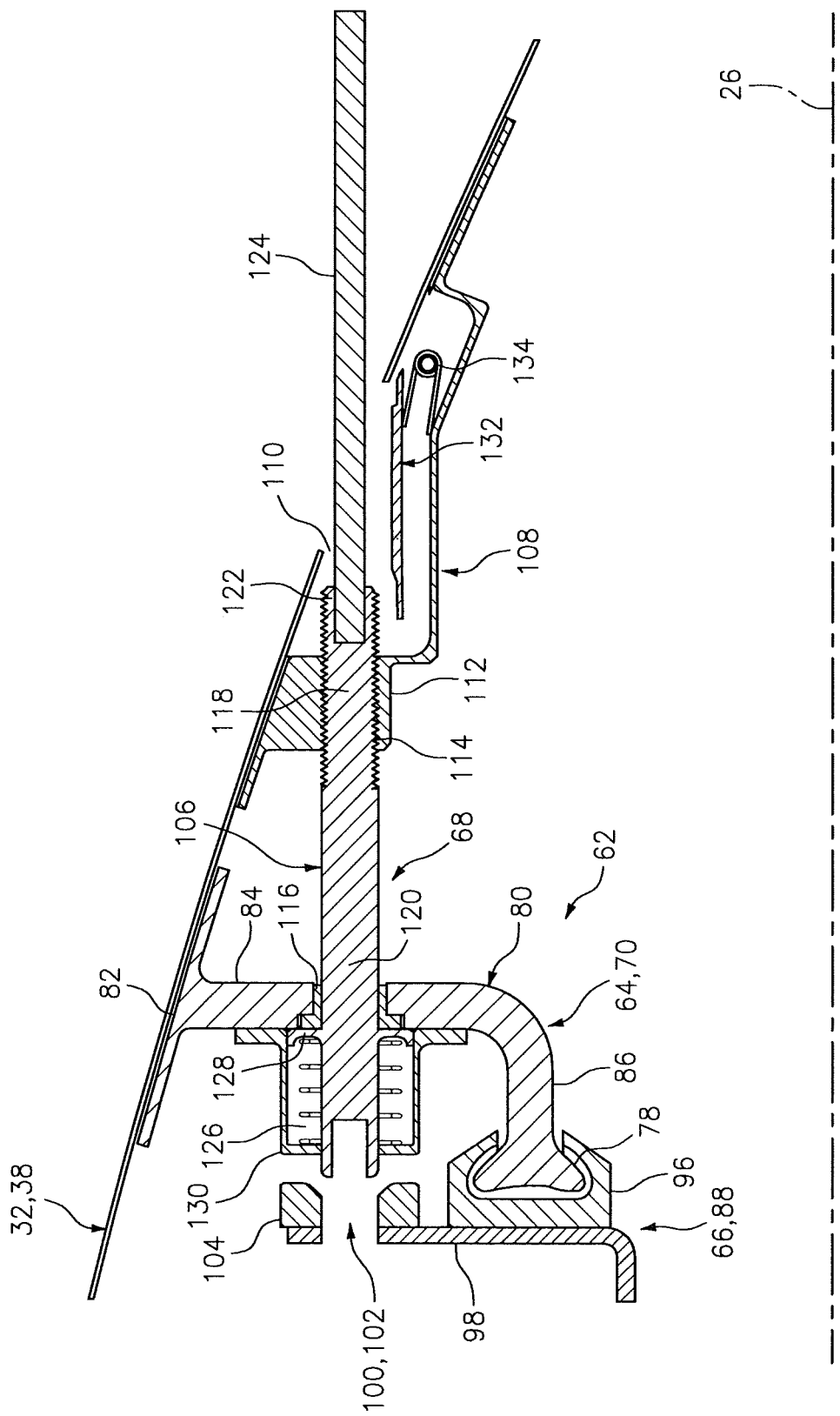
FIG. 5 is a side sectional diagrammatic illustration of a translatable joint assembly with a lock bolt in a disengaged position.
Figure 6:
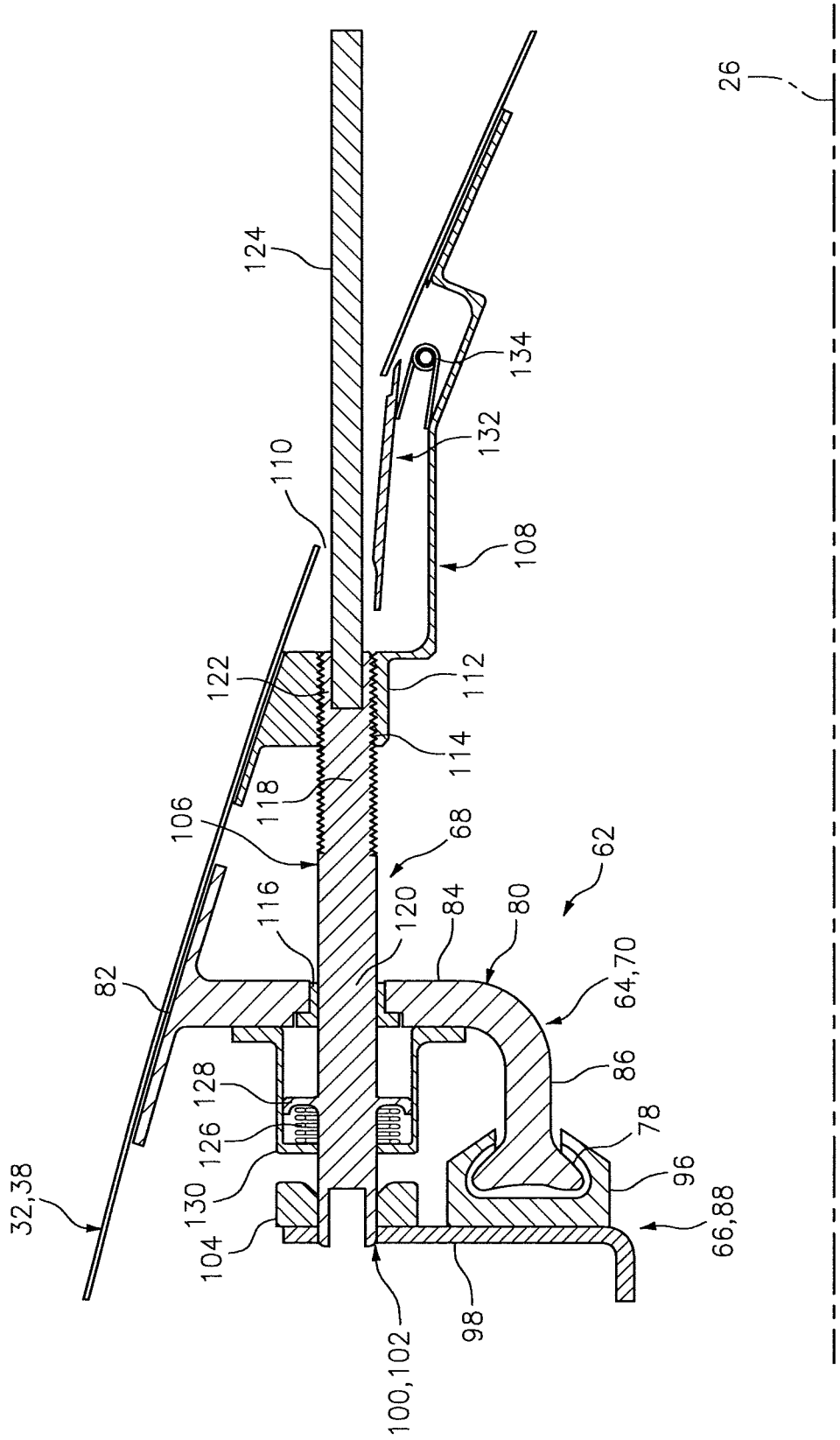
FIG. 6 is a side sectional diagrammatic illustration of the translatable joint assembly with the lock bolt in an engaged position.

FIGS. 5 and 6 are sectional diagrammatic illustrations of an exemplary translatable joint assembly 62. This translatable joint assembly 62 is representative of a general configuration of each of the translatable joint assemblies 58-60 of FIG. 4. Of course, in other embodiments, one or more of the translatable joint assemblies 58-60 of FIG. 4 may have a different configuration than that shown in FIGS. 5 and 6. The present disclosure therefore is not limited to the specific translatable joint assembly of FIGS. 5 and 6.

The translatable joint assembly 62 of FIGS. 5 and 6 includes a component 64, a component 66 and a lock 68. The component 64 may be configured as or otherwise include a slider rail 70. Referring to FIG. 7, this slider rail 70 has a longitudinal length 72 that extends axially along the centerline 26 between a slider forward end 74 and a slider aft end 76. The slider rail 70 includes a slider 78 (e.g., a lug) that extends axially and, for example, uninterrupted between the slider forward end 74 and the slider aft end 76. The slider 78 of FIG. 5 has a double lobed cross-section. However, in other embodiments, the slider 78 may have other cross-sections; e.g., a single lobed (e.g., circular or oval) cross-section.

The slider rail 70 also includes a slider mounting bracket 80 that fixedly mounts the slider 78 to the fanlet 32; e.g., the fan cowl 38. The slider mounting bracket 80 of FIG. 5 includes a base 82, a web 84 and a flange 86. The base 82 is mechanically fastened, bonded (e.g., welded, brazed, adhered, etc.) and/or otherwise attached to the fanlet 32; e.g., the fan cowl 38. The web 84 extends between and connects the base 82 and the flange 86. The flange 86 projects out from a distal end of the web 84 to the slider 78. The flange 86 may be arranged approximately perpendicular to the web 84 such that the flange 86 is generally horizontal and the web 84 is generally vertical relative to gravity. However, the present disclosure is not limited to such a gravitational orientation or exemplary slider mounting bracket configuration.

The component 66 may be configured as or otherwise include a track rail 88. Referring to FIG. 8, this track rail 88 has a longitudinal length 90 that extends axially along the centerline 26 between a track forward end 92 and a track aft end 94. This longitudinal length 90 may be substantially equal to (or greater than or less than) the longitudinal length 72 of the slider rail 70. The track rail 88 includes a track 96 (e.g., a C-channel) that extends axially and, for example, uninterrupted between the track forward end 92 and the track aft end 94. Referring to FIG. 5, the track 96 is configured to receive the slider 78 within a channel thereof. In this manner, the slider 78 is mated with and configured to slide axially along the track 96.

Figure 9:
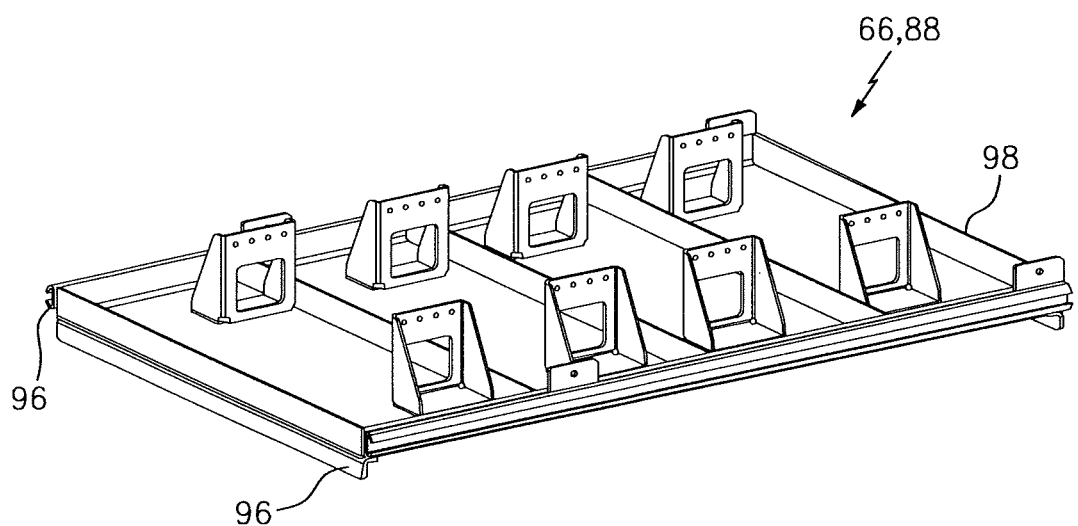
FIG. 9 is a perspective diagrammatic illustration of a plurality of tracks configured with a common mounting bracket for installation to a pylon.
Figure 10:
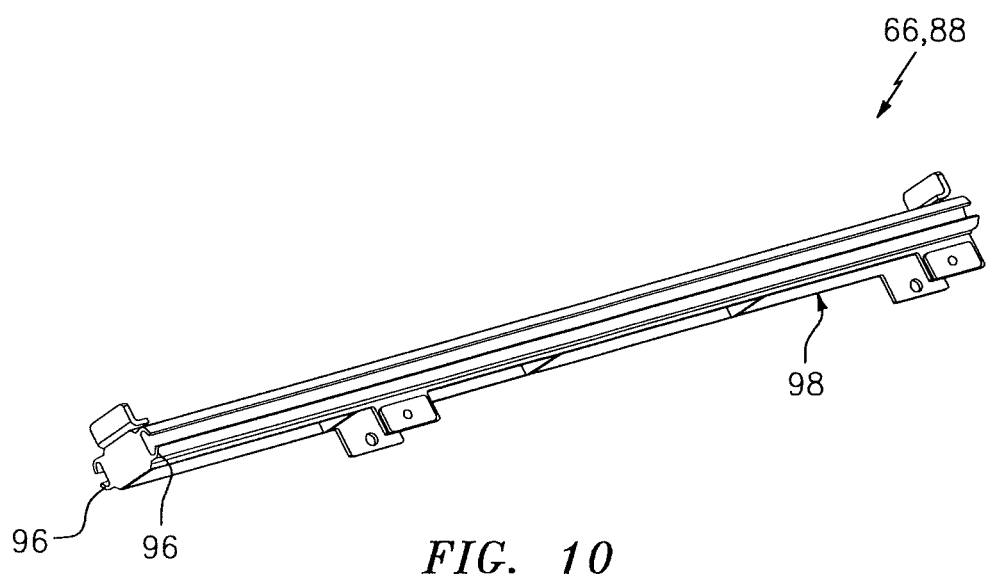
FIG. 10 is a perspective diagrammatic illustration of a plurality of tracks configured with another common mounting bracket.

The track rail 88 also includes a track mounting bracket 98 that fixedly mounts the track 96 to the static structure 44 (see FIG. 4); e.g., the pylon structure 46 and/or the fan case 42. Specific exemplary embodiments of such a track mounting bracket 98 are illustrated in FIGS. 9 and 10; however, the present disclosure is not limited to such exemplary configurations. Referring again to FIGS. 5 and 8, the track mounting bracket 98 includes one or more bolt apertures 100 and 102. These bolt apertures 100 and 102 are arranged along the longitudinal length 90 of the track rail 88 adjacent the track 96 as best shown in FIG. 8. Each of these bolt apertures 100, 102 extends laterally through the bracket 98. Each bolt aperture 100, 102 may also extend laterally through a reinforcement portion 104 of the bracket 98 (see FIGS. 5 and 6); e.g., a grommet. However, in other embodiments, one or more of the bolt apertures 100 and 102 may extend laterally into the bracket 98 from the side of the bracket 98 on which the track 96 is mounted and disposed.

Referring to FIG. 6, the lock 68 is configured to substantially prevent axial translation of the fanlet 32 when the fanlet 32 is in the closed position and/or the open position. More particularly, the lock 68 is configured to engage the aperture 100 (see also FIG. 8) when the fanlet 32 is in the closed position (e.g., see FIG. 1). The lock 68 is configured to engage the aperture 102 (see also FIG. 8) when the fanlet 32 is in an open position.

The lock 68 of FIGS. 5 and 6 includes a bolt 106 (e.g., generally cylindrical pin) and a housing 108. The housing 108 is fixedly mounted to the fanlet 32 (e.g., the fan cowl 38) adjacent an access port 110; e.g., a through-hole. The housing 108 includes a fixed base 112 with a threaded aperture 114. The threaded aperture 114 extends laterally through the fixed base 112 and is aligned (e.g., co-axial) with and laterally between the access port 110 and an aperture 116 in the slider mounting bracket 80 (e.g., the web 84).

A threaded portion 118 of the bolt 106 is mated with and extends through the threaded aperture 114. An intermediate portion 120 of the bolt 106 is mated with and extends through the aperture 116. An outer distal end of the bolt 106 includes an engagement feature 122 (e.g., a hexagonal socket), which enable a tool such as a driver 124 (e.g., a hexagonal driver tool) to engage the bolt 106 through the access port 110. Upon engagement, the driver 124 may be manipulated (e.g., manually by hand) to spin the bolt 106 about a longitudinal axis thereof. The threaded connection between the bolt 106 and the fixed base 112 translates the spinning motion of the bolt 106 into lateral motion of the bolt 106 along the longitudinal axis. In this manner, an inner distal end of the bolt 106 may be moved laterally into the aperture 100, 102 (see FIG. 6) to prevent lateral translation of the fanlet 32, and out of the aperture 100, 102 (see FIG. 5) to enable lateral translation of the fanlet 32.

The bolt 106 and, thus, the lock 68 may be spring loaded. For example, the bolt 106 may extend through a bore of a coil spring 126. This coil spring 126 may be located laterally between a shoulder 128 on the bolt 106 and a spring housing 130 attached to the slider mounting bracket 80. With this arrangement, the coil spring 126 biases the bolt 106 towards its disengaged position; e.g., where the inner distal end of the bolt 106 is disengaged from the aperture 100, 102 and the track mounting bracket 98.

Figure 11:
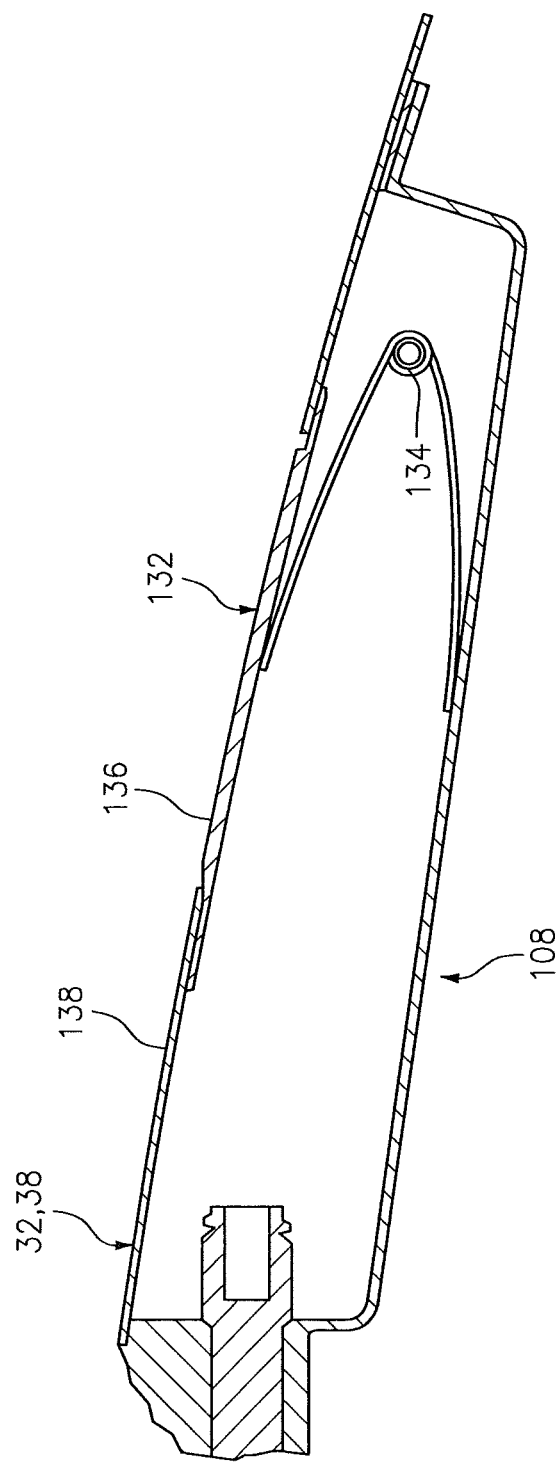
FIG. 11 is a partial side sectional diagrammatic illustration of a cowl and a lock for a translatable joint assembly.
Figure 12:
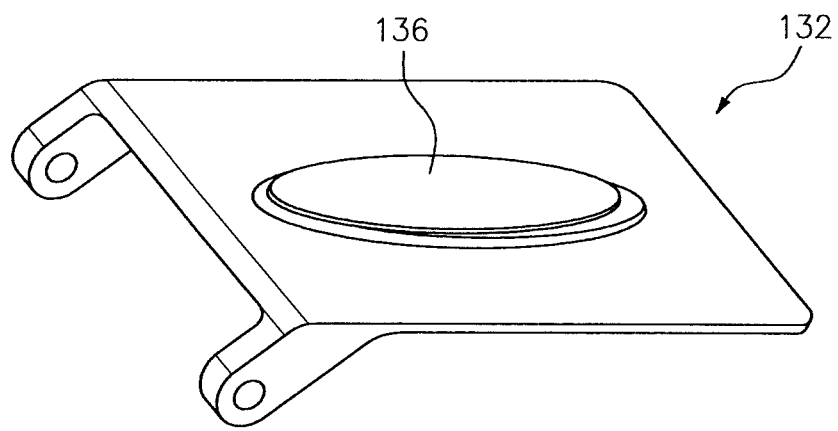
FIG. 12 is a perspective diagrammatic illustration of an access door.

An access door 132 may be mounted to the housing 108. When open, the access door 132 is configured to allow the driver 124 access to the bolt 106 through the access port 110. When closed, the access door 132 is configured to close the access port 110. The access door 132 may be spring loaded via a torsional spring 134 to prevent or reduce unwanted opening of the access door 132 during propulsion system 20 operation. Referring to FIGS. 11 and 12, the access door 132 may include a plug portion 136 configured to provide the fanlet 32 with a substantially smooth and continuous aerodynamic surface 138 proximate the access port 100 when the access door 132 is closed by the spring 134. More particularly, the spring 134 may bias the access door 132 against the fanlet 32 and thereby help to maintain the aerodynamic surface 138 of FIG. 11. With such a configuration, the lock 68 is accessible from an exterior of the fanlet 32 through the access port 110, for example, by pushing the access door 132 inward from the exterior of the fanlet 32.

Figure 13:
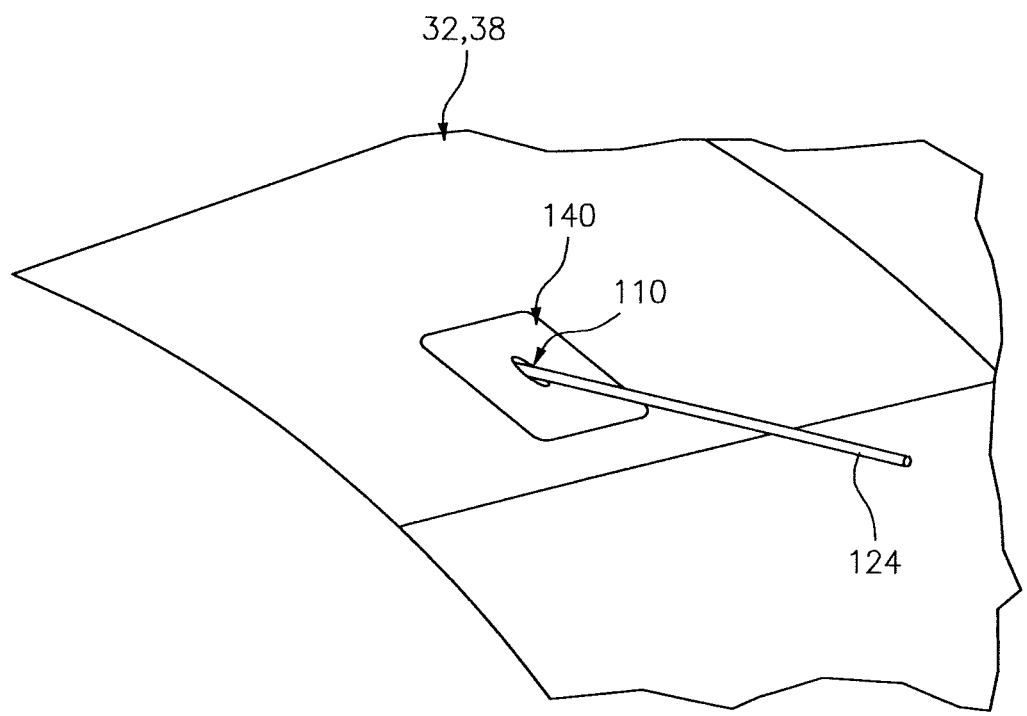
FIG. 13 is a partial perspective diagrammatic illustration of an access port in a cowl and associated markings.

In some embodiments, referring to FIG. 13, markings 140 may be provided on the fanlet 32 proximate the access port 110 to facilitate engagement and disengagement of the lock 68.

Each of the translatable joint assemblies 58-60 is described above as including a lock. However, in other embodiments, one or more of the translatable joint assemblies 58-60 of FIG. 4 may be configured without a lock. For example, only one of the two translatable joint assemblies 59, 60 in the lower pairs may include a lock.

In some of the embodiments, the arrangement of the component 64 and the component 66 may be reversed. In such embodiments, the track rail 88 is mounted to the fanlet 32 and the slider rail 70 is mounted to the static structure 44. In addition, the lock 68 is mounted with the track rail 88 rather than the slider rail 70.

In some embodiments, one or more of the translatable joint assemblies 58-60 may include additional bolt apertures enable locking the fanlet 32 in a partially open position.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An assembly for an aircraft propulsion system, comprising:
   a fanlet including an inlet structure and a fan cowl; and
   a track system configured to enable axial translation of the inlet structure and the fan cowl along a centerline between an open position and a closed position;
   the track system including a first component, a second component and a lock, wherein one of the first and the second components comprises a slider, the other one of the first and the second components comprises a track, and the slider is mated with and configured to slide axially along the track; and
   the lock comprising a bolt mounted with the first component, wherein the lock is configured to move the bolt laterally into an aperture in the second component to prevent axial translation of the fanlet.

2. The assembly of claim 1, wherein the lock is configured to move the bolt laterally into the aperture in the second component when the fanlet is in the closed position.

3. The assembly of claim 2, wherein the lock is configured to move the bolt laterally into a second aperture in the second component to prevent axial translation of the fanlet when the fanlet is in the open position.

4. The assembly of claim 1, wherein the lock is configured to move the bolt laterally into the aperture in the second component when the fanlet is in the open position.

5. The assembly of claim 1, wherein the slider is mounted to the fanlet.

6. The assembly of claim 5, further comprising a fan case, wherein the track is mounted to the fan case.

7. The assembly of claim 1, further comprising a static structure, wherein the first component is mounted with the fanlet and the second component is mounted with the static structure.

8. The assembly of claim 7, wherein the static structure comprises a fan case.

9. The assembly of claim 1, wherein the bolt is spring loaded.

10. The assembly of claim 1, wherein the lock further includes a fixed base, and a threaded portion of the bolt is mated with a threaded aperture in the fixed base.

11. The assembly of claim 1, wherein the lock is operable to be actuated by a driver tool.

12. The assembly of claim 1, further comprising a spring loaded access door configured to close an access port in the fanlet, wherein the lock is accessible from an exterior of the fanlet through the access port.

13. The assembly of claim 1, wherein
   the track system further includes a third component, a fourth component and a second lock, one of the third and the fourth components comprises a second slider, the other one of the third and the fourth components comprises a second track, and the second slider is mated with and configured to slide axially along the second track; and
   the second lock comprises a second bolt mounted with the third component, the second lock is configured to move the second bolt laterally into a second aperture in the fourth component to prevent axial translation of the fanlet.

14. An assembly for an aircraft propulsion system, comprising:
   a nacelle structure comprising a cowl; and
   a track system configured to enable axial translation of the cowl along a centerline between an open position and a closed position, the track system including a first component, a second component and a lock, the first component comprising an axially extending slider, and the second component comprising an axially extending track;
   the first component fixedly mounted with the cowl, and the slider mated with and configured to slide axially along the track; and
   the lock comprising a bolt mounted with the first component, wherein the lock is configured to move the bolt laterally into an aperture in the second component to prevent axial translation of the nacelle structure.

15. An assembly for an aircraft propulsion system, comprising:
   a nacelle structure comprising a fan cowl; and
   a track system configured to enable axial translation of the fan cowl along a centerline between an open position and a closed position, the track system including a first component, a second component and a lock, the first component comprising an axially extending slider, the second component comprising an axially extending track, and the slider mated with and configured to slide axially along the track;

the lock configured to engage a first aperture in the second component to prevent axial translation of the nacelle structure at the closed position, and the lock further configured to engage a second aperture in the second component to prevent axial translation of the nacelle structure at the open position.

16. The assembly of claim 15, wherein the lock comprises a bolt mounted with the first component; and the lock is configured to move the bolt laterally into the first aperture at the closed position and laterally into the second aperture at the open position.

17. The assembly of claim 15, wherein the lock is spring loaded.

18. The assembly of claim 15, wherein the track system further includes a third component, a fourth component and a second lock, the third component comprising an axially extending second slider, the fourth component comprising an axially extending second track, and the second slider mated with and configured to slide axially along the second track; and the second lock configured to engage a third aperture in the second component to prevent axial translation of the nacelle structure at the closed position, and the second lock further configured to engage a fourth aperture in the second component to prevent axial translation of the nacelle structure at the open position.

19. The assembly of claim 15, wherein the nacelle structure comprises a nacelle fanlet.

\* \* \* \* \*